United States Patent [19]

Hobbs

[11] 4,184,314

[45] Jan. 22, 1980

[54] FOLDABLE TRI-SECTION VINE FLUFFER

[76] Inventor: Oliver K. Hobbs, P.O. Box 1306, Suffolk, Va. 23434

[21] Appl. No.: 879,490

[22] Filed: Feb. 21, 1978

[51] Int. Cl.² ............................................ A01D 29/00
[52] U.S. Cl. ....................................... 56/372; 56/10.3; 56/11.9; 56/228; 56/364
[58] Field of Search ............... 56/372, 228, 11.9, 10.3, 56/364, 15.7

[56] References Cited

U.S. PATENT DOCUMENTS

| | | | |
|---|---|---|---|
| 2,539,834 | 1/1951 | Hatton | 56/364 |
| 2,751,745 | 6/1956 | McGee | 56/364 |
| 3,342,025 | 9/1967 | van der Lely | 56/372 |
| 3,433,000 | 3/1969 | Brade | 56/15.7 |
| 3,468,107 | 9/1969 | van der Lely | 56/11.9 |
| 3,717,981 | 2/1973 | van der Lely | 56/228 |
| 3,729,910 | 5/1973 | Hardee | 56/11.9 |

*Primary Examiner*—Jay N. Eskovitz
*Attorney, Agent, or Firm*—Stevens, Davis, Miller & Mosher

[57] ABSTRACT

A vine fluffer is provided with a middle conveyor section and a pair of outer flanking conveyor sections with the outer sections each pivotable about a respective pivot axis so as to be movable from an operative horizontal position in which all three conveyor sections are aligned to an inoperative vertically disposed position for storage and transportation. Each pivot axis passes through a pivot pin coupling the frame of a respective outer conveyor section to the frame of the middle conveyor section and a universal joint which couples conveyor motive power transmitted through the middle conveyor section to the two outer conveyor sections.

3 Claims, 12 Drawing Figures

FOLDABLE TRI-SECTION VINE FLUFFER

BACKGROUND OF THE INVENTION

The present invention relates generally to vine fluffers and, more particularly, to a peanut fluffer containing three vine conveying sections horizontally aligned for fluffing previously dug peanut plants formed in windrows.

As is generally known, most peanut diggers currently used harvest the peanut plant by cutting the tap root approximately two to three inches below the surface of the earth, separating the peanuts and upper vegetation from the earth, and depositing the plants on the ground in an inverted state, i.e., the peanuts face upwards. The inverted peanut plants are formed into windrows by the peanut digger and are later subject to a combining operation. The combining operation thrashes the nuts from the vines while separating peanuts from shreaded vines. When first cut, the peanut plant vines contain a very high moisture content making it difficult to separate the peanuts from the vines and it is therefore generally desired to combine the peanut plants after the vines have dried to the point where they have a low moisture content, typically 15% to 20%. This requires that the peanut plants lie on the ground for three to five days before combining, depending on climatic conditions.

One impediment to an early combining of the windrows following the digging operation is the inability of the lowermost vines to dry because of poor air circulation and lack of sun exposure. Also, the vines directly touching the ground absorb moisture which further prolongs the drying period. Morning dew is also a problem since it must be evaporated from the vines prior to combining and, of course, rain is a problem not only because it wets the vines, but also, because it causes dirt from the vines to flow to the bottom of the windrow sealing the leaves of the vines to the ground. To solve the problem of moisture acccumulation and thereby facilitate the combining operation, it is generally known to reshake the peanut vines to allow air to circulate in and around the vines, particularly those touching the ground. Generally, a shaker or fluffer device operates to temporarily lift the vines off the ground via a conveyor device without otherwise disturbing the windrows.

It has been particularly desirable to construct peanut fluffers of a width sufficient to handle six peanut rows or three windrows on a single pass. This reduces the number of passes per field since the job should be done quickly in the morning prior to a combining operation. However, a three windrow wide fluffer typically has three conveyor sections, one for each windrow, and when used, necessarily occupies a very large width making it difficult to maneuver and move from one field to another. Very often it will be impossible to get a typical peanut fluffer through a farm gate and, of course, such a machine would never fit within a vehicle lane of a roadway, thus inhibiting its transportation thereon. Obvious storage problems are also present.

Accordingly, one of the objects of the present invention is to provide an improved peanut fluffer capable of fluffing three windrows at a time, but which occupies a relatively small amount of space during storage and transport thereby making it easily transported from field to field and, if required, capable of being transported along a vehicle roadway. A peanut fluffer constructed in accordance with the present invention contains three conveyor sections, a continuously horizontally disposed middle section and two flanking outer sections which are pivotable relative to the middle section. The pivot axis for each outer section allows the movement of the outer sections between a substantially horizontally disposed operative position and a substantially vertically disposed or folded position for transportation and storage of the fluffer.

The raising and lowering of the outer sections relative to the middle section is controlled by a pair of hydraulic cylinders which respectively couple the middle section to the outer sections. Each hydraulic cylinder is operated through a pair of hydraulic check valves which prevent the outer sections from being lowered should a rupture occur in the hydraulic control lines eminating from a tractor. The power operated check valves also eliminate the danger of the outer sections falling during storage.

Since all three conveyor sections are supplied with operative power from a hauling tractor, it becomes difficult to supply this operative power to a tri-sectional folding fluffer. Accordingly, another object of the invention is the provision of a unique arrangement for supplying motive power from a tractor through the middle conveyor section to the two outer conveyor sections. This arrangement makes use of a pair of universal joints which are aligned respectively with the pivot axes about which each outer section rotates. Preferably, the universal joint forms one pivot point of only two pivot points provided for each outer section. The other pivot point being provided by a pin which couples the frame of a respective outer conveyor section to the frame of the middle section.

The foldable peanut fluffer will be transported by a tractor creating a possibility that the tractor operator may accidentally engage the tractor power train output (P.T.O.) which is coupled with the driving shafts for the three conveyor sections while the outer sections are in a raised position. If this occurs, large stresses will be created on the mechanical components of the foldable fluffer, particularly the universal joint, because the two halves of each universal joint would be substantially perpendicular to one another. Accordingly, another object of the invention is the provision of suitable apparatus to prevent mechanical damage should this occur. To this end, a double disc adjustable clutch is provided for coupling output motive power from the tractor to the drive shafts of the conveyor sections. If the tractor P.T.O. is inadvertently engaged with the outer sections in a raised position, the clutch will slip preventing mechanical damage.

Another problem with typical prior art peanut diggers and fluffers is that they are often supported during storage by cinder blocks, jacks or other types of stand supports. These additional supporting devices, which tend to be bulky, heavy, unsafe, and sometimes expensive, are often lost or damaged. In addition, if these conventional supports were used on a foldable fluffer, serious stability problems would arise. Accordingly, another object of the invention is the provision of parking stands formed integrally with the outer conveyor sections which are operative when the outer conveyor sections are in a raised position to support the folding fluffer without the need for additional support stands.

It is the exception rather than the rule that a field of peanuts will be dug in such a manner that each windrow is well formed along its edges. In addition, parasite plants, diseased peanut plants, soil erosion, inadequate land preparation, terraced fields, malfunctioning peanut planters, cultivators or diggers, and operator error are other factors which may contribute to the formation of a windrow with irregular edges. Because of irregular windrow edges, it becomes difficult to lift or fluff those peanut plants on the edge of a windrow; that is, they are not fluffed as much as, if at all, vines located in the center of the windrow. Accordingly, an additional object of the invention is the provision of a foldable fluffer in which each of the conveyor sections is provided with vine guides which function to channel vines at the edges of a windrow towards the center of the conveyor. The vine guides are preferably formed from bars which are attached to the conveyor sections near their inputs. The bars are bent to pass in front of the driving chains for each conveyor section at an angle oblique to the plane in which the driving chains rotate.

These and other objects of the invention will be readily appreciated from the following description of the invention which is taken in conjunction with the accompanying drawings.

DETAILED DESCRIPTION OF THE INVENTION

Figure 5:
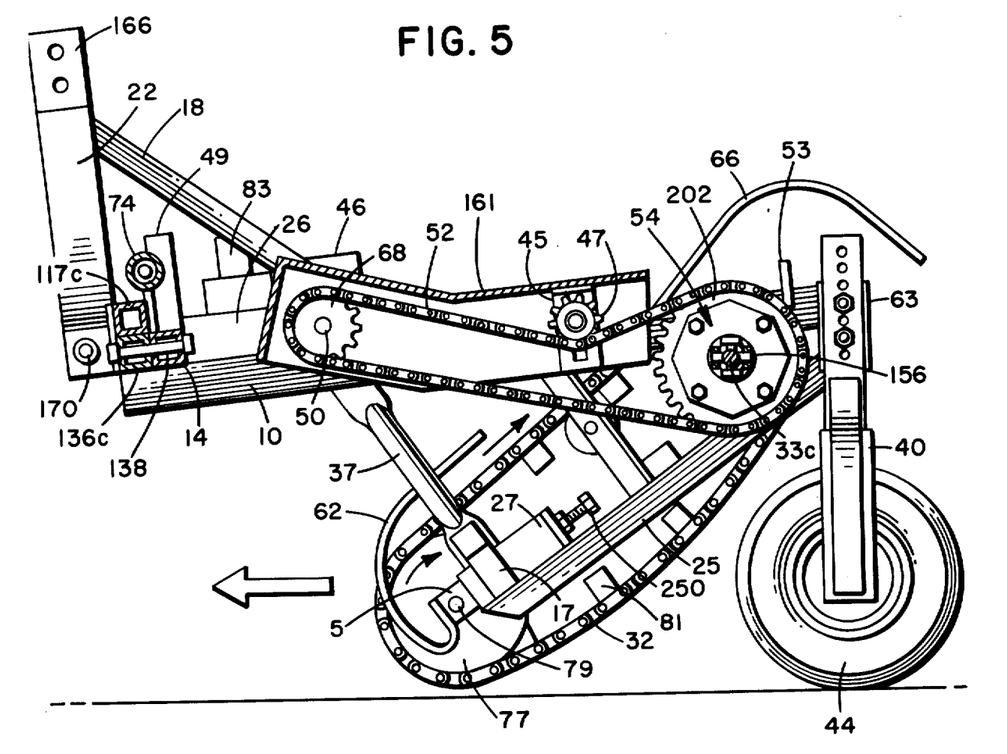
FIG. 5 illustrates the fluffer in a sectional view taken along line 5—5 of FIG. 1B.

The construction details of the invention will now be described with particular reference to FIGS. 1 through 5. Three peanut fluffing conveyor sections are employed in the present invention; a center or middle section designated generally as B and two outer sections respectively designated as A and C. Each section shares a similar, but not identical, frame construction. Referring first to section B, the frame assembly is constructed of rectangular tubing, flat bars, and angle members. It includes parallel rectangular tubing members 8 and 10 interconnected by transverse rectangular tubing members 12 and 14. Extending downwardly at an angle with respect to rectangular tubing members 8 and 10 are additional rectangular tubing members, only one being illustrated as element 25 (FIG. 5). The downwardly extending members are connected on one end to the end of a respective member 10 and 8 and are also connected to the respective tubing members 10 and 8 by a pair of angle connection members (only one labeled 29 being shown). Further coupling between the downwardly extending members and the tubing members 8 and 10 is provided via a pair of curved frame interconnecting members 35 and 37. A pair of stiffener plates 15 and 17 are provided where the curved frame interconnecting members are attached to the downwardly extending frame members. A pair of housings 23 and 27 respectively mounting adjustable idler wheel shaft supports 3 and 5 and associated vine guards 60 and 62 is also provided. Adjustment of idler wheel shaft supports 3 and 5 and thus conveyor chain tension is effected by adjusting screws, only the one for support 5 (labeled 250) being shown in FIG. 5. Frame members 8 and 10 are connected with channel members 61 and 63 which provide a socket for respective adjustable wheel mounting assemblies 38 and 40 supporting wheels 42 and 44. Also provided on frame member 10 is an idler bracket 45 (FIG. 5) which has mounted thereon an adjustable idler wheel 47 for adjusting the tension in a power transmission chain 52 which provides motive power to all three conveyor sections.

The middle conveyor section B further includes tractor hitch support arms 24 and 26 provided with hitch points 168 and 170. A third hitch point 166 is provided by the ends of upwardly extending support arms 20 and 22 connected respectively on opposite ends to the ends of hitch support arms 24 and 26. Additional upwardly extending hitch point support arms 16 and 18 are also provided and are connected to frame support element 12. Support wings 52 and 53 connected to frame members 8 and 10 are provided to support the outer conveyor sections A and C when raised.

Also provided on the central conveyor section B is a gear box support 28 connected between frame members 12 and 14. A gear box 48 rests on support 28. A stiffening bar 49 has its ends connected with frame member 14 and passes over the input shaft 48 of gear box 46. A shaft channel is formed by bars 65 and 67 which are connected between bars 49 and frame member 14. Stiffening bar 49 supports a T fitting 78 for hydraulic hoses 76 and a hydraulic pilot operated check valve and hose connection assembly 81.

Figure 1A:
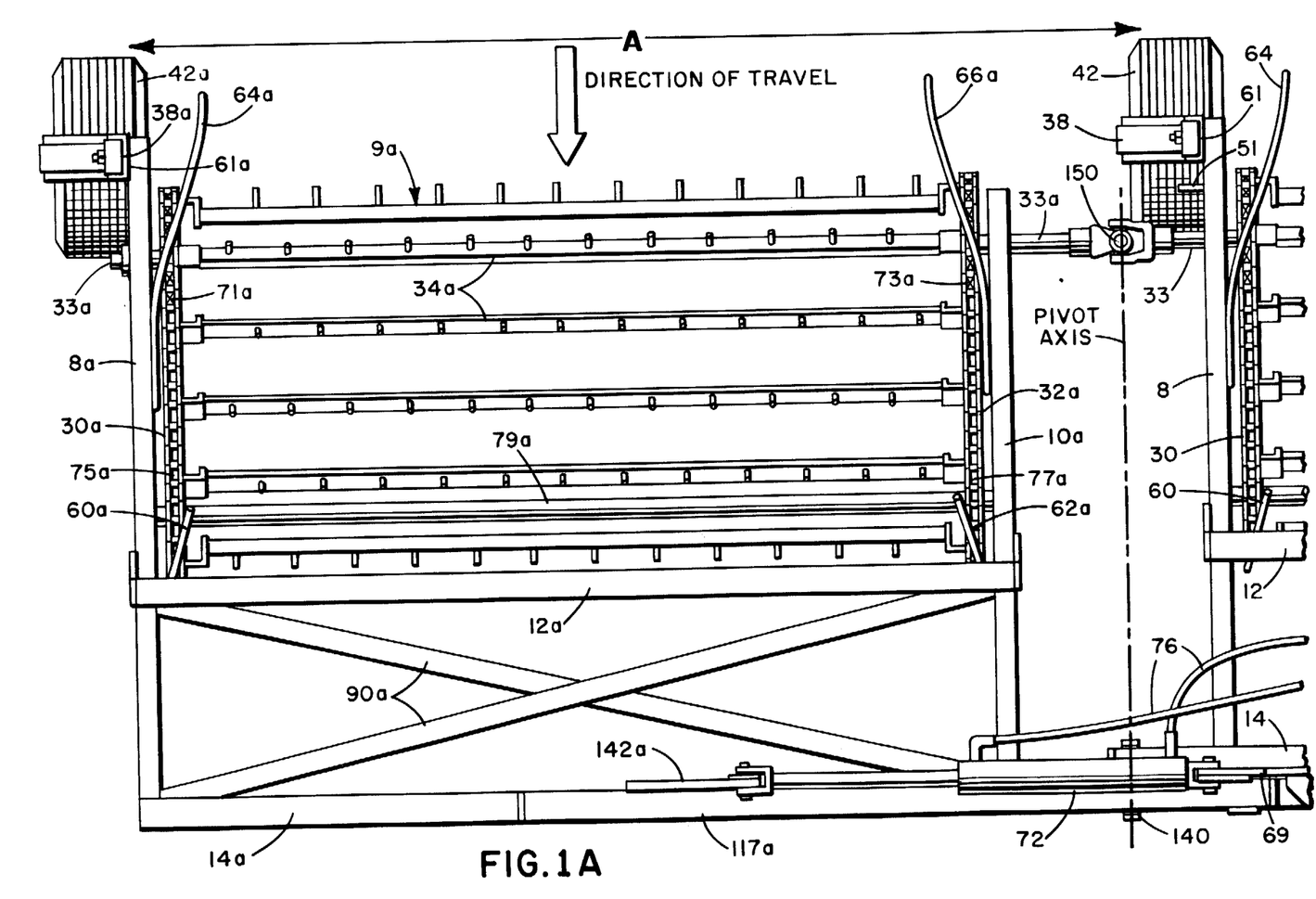
FIGS. 1A, 1B, and 1C taken together illustrate in top plan view a preferred embodiment of a three section foldable peanut fluffer.
Figure 1B:
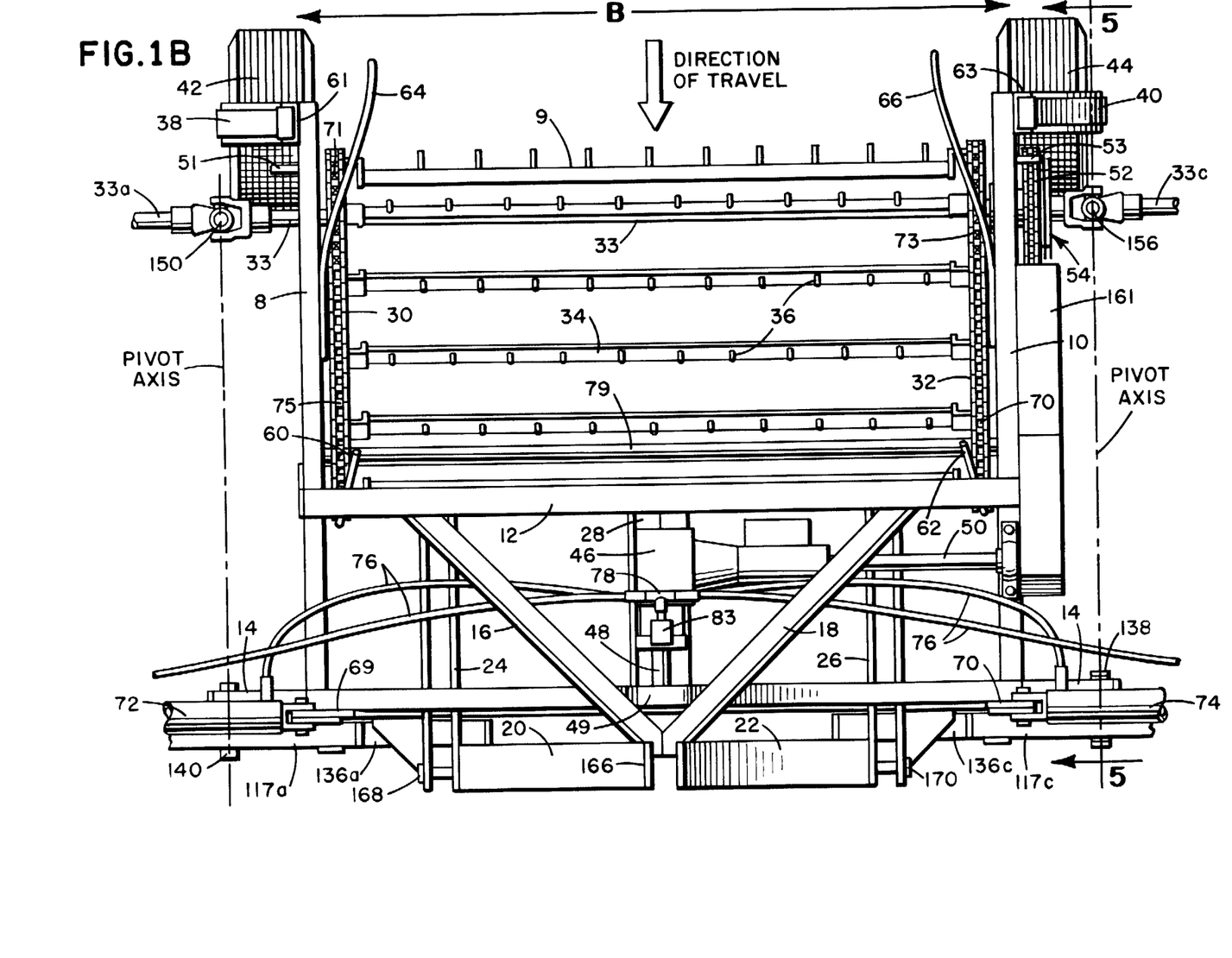
Figure 1C:
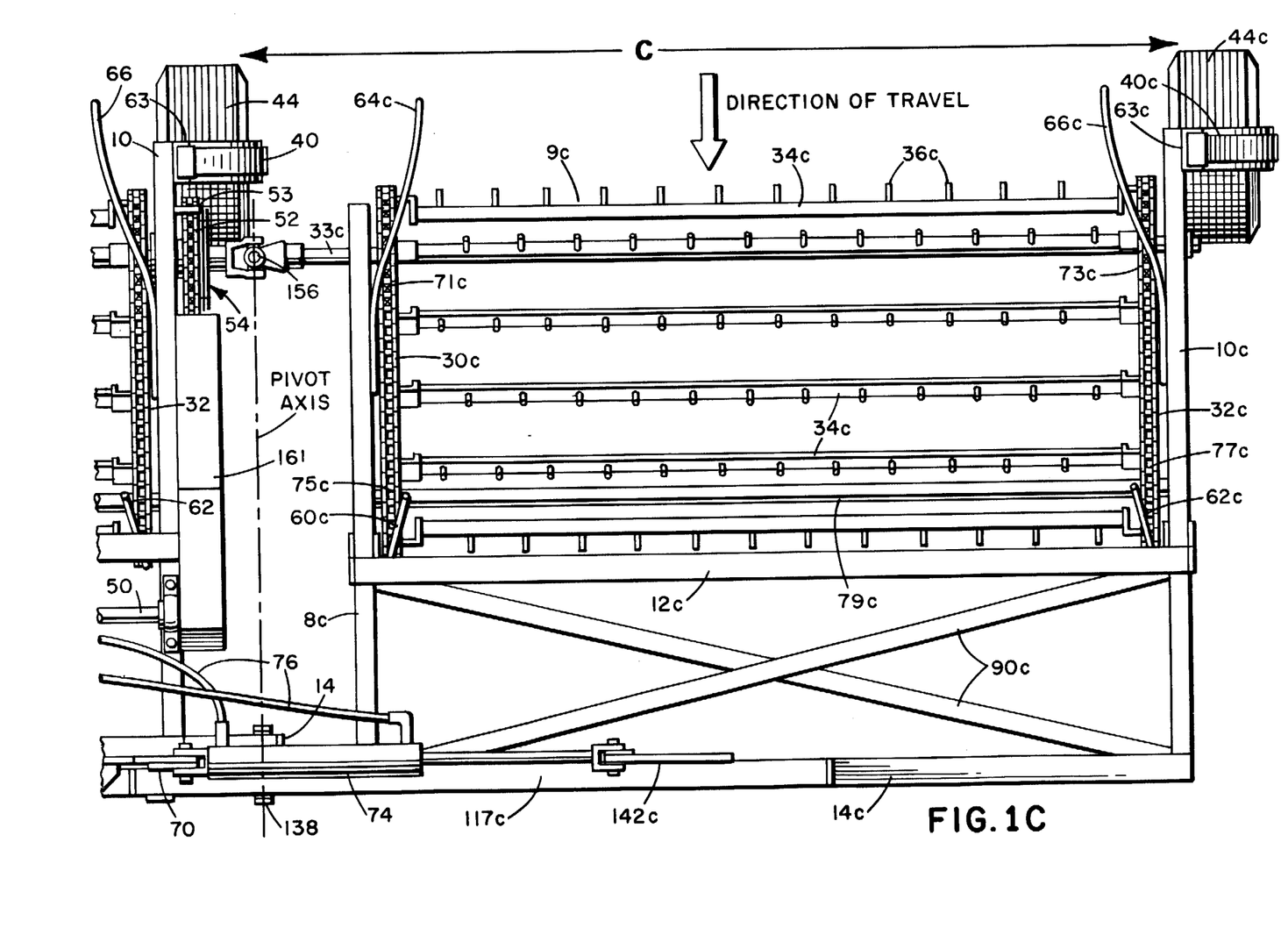
Figure 2A:
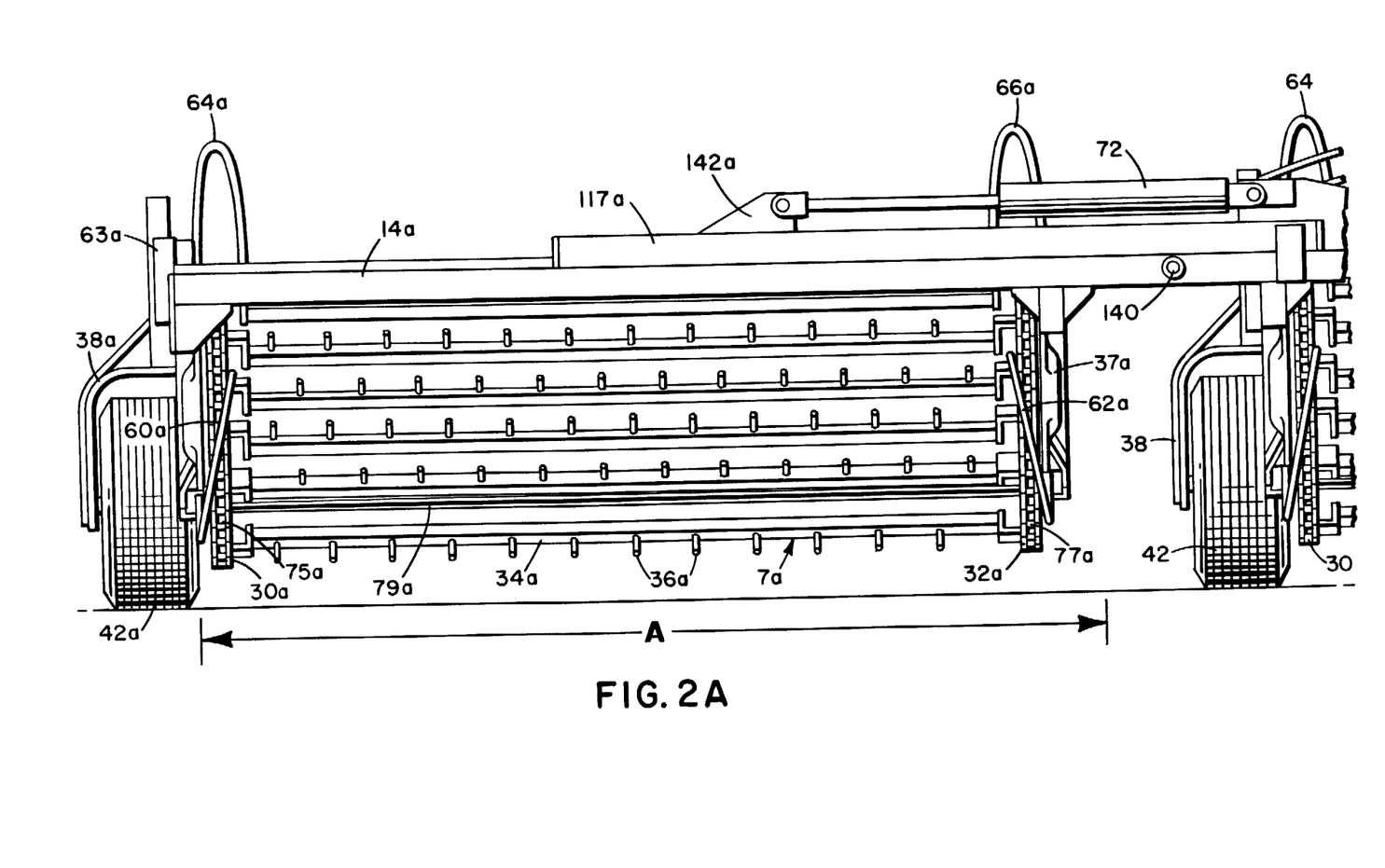
FIGS. 2A, 2B, and 2C taken together illustrate a front view of the peanut fluffer of FIG. 1.
Figure 2B:
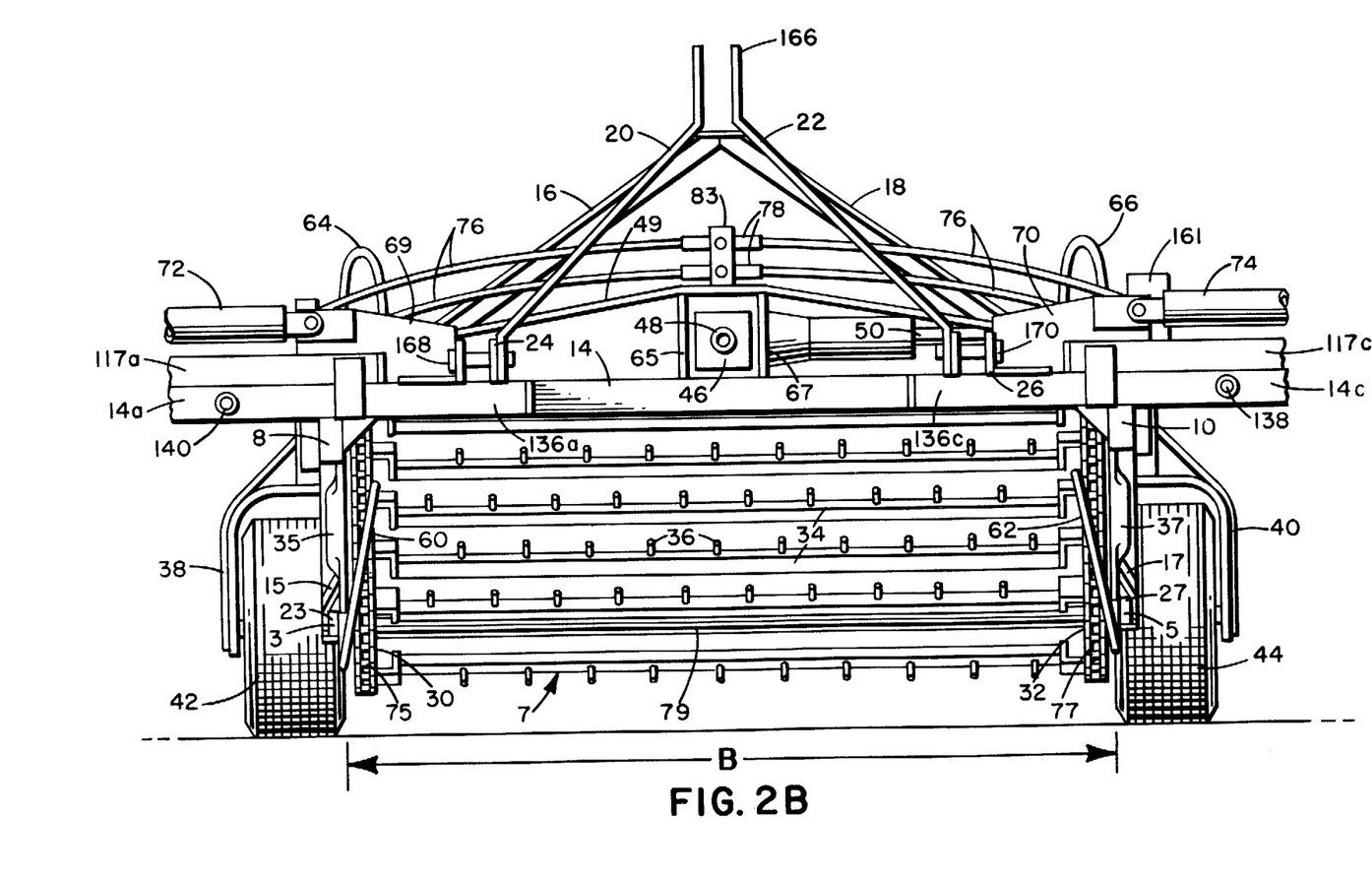
Figure 2C:
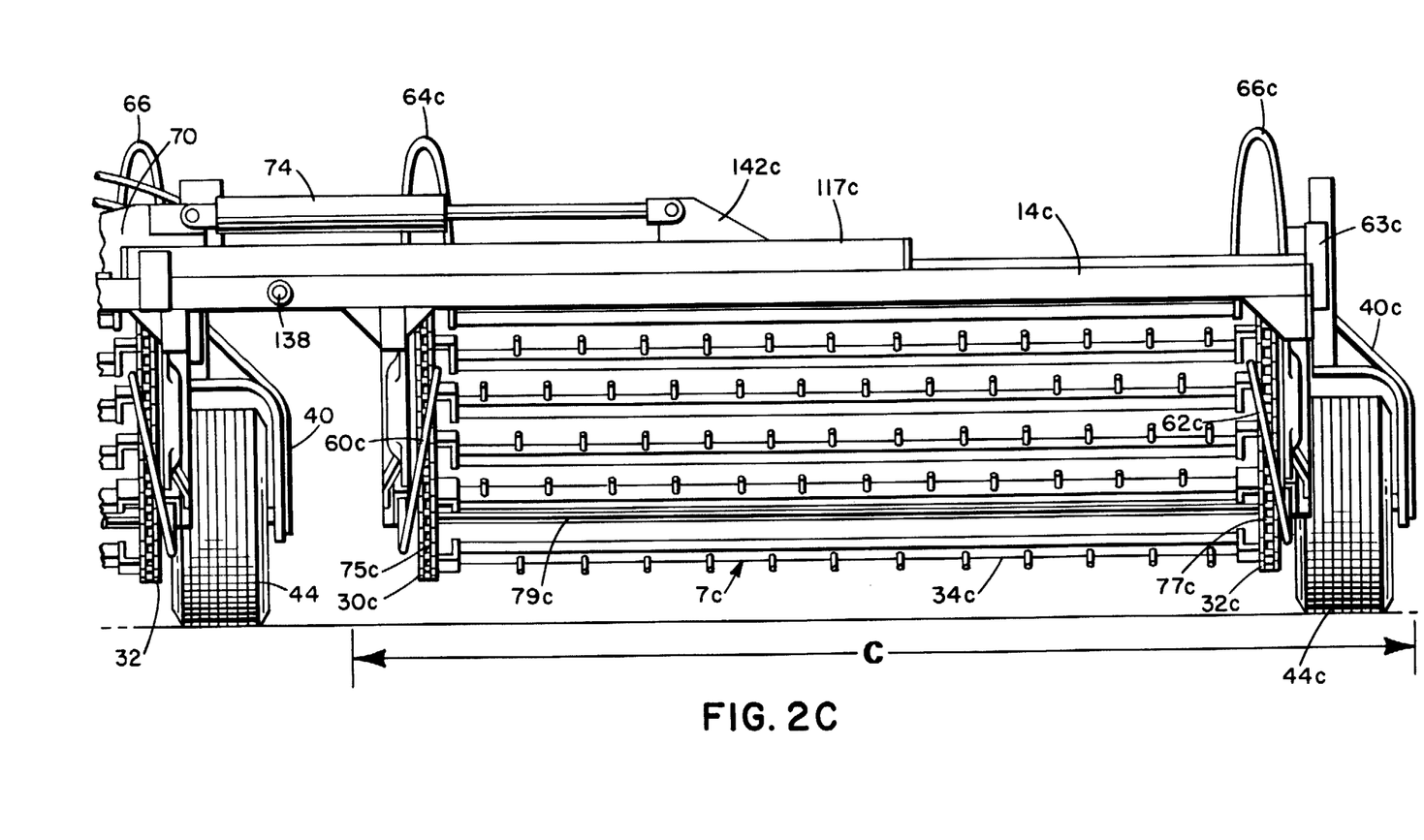
Figure 3:
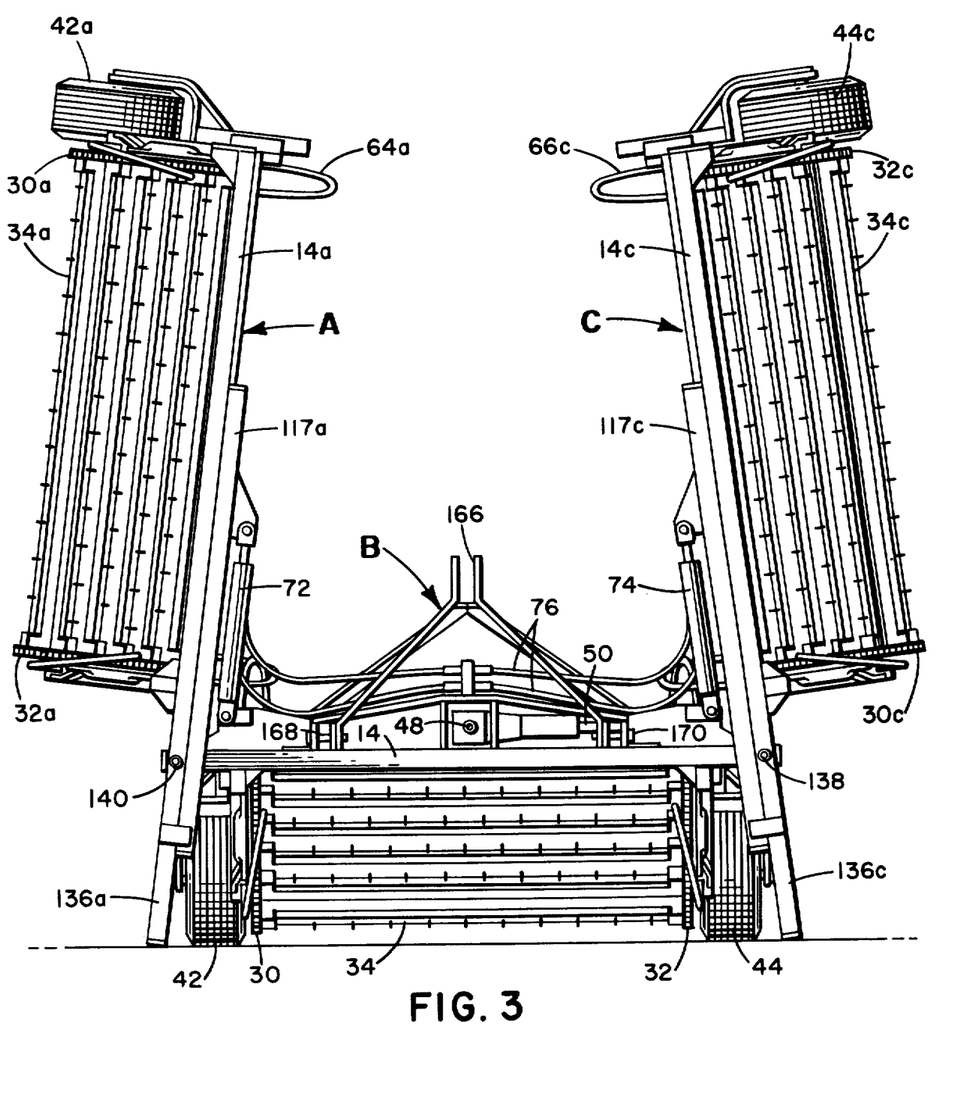
FIG. 3 illustrates in front view the peanut fluffer of FIG. 1, but with the outer conveyor sections in a raised position.
Figure 4:
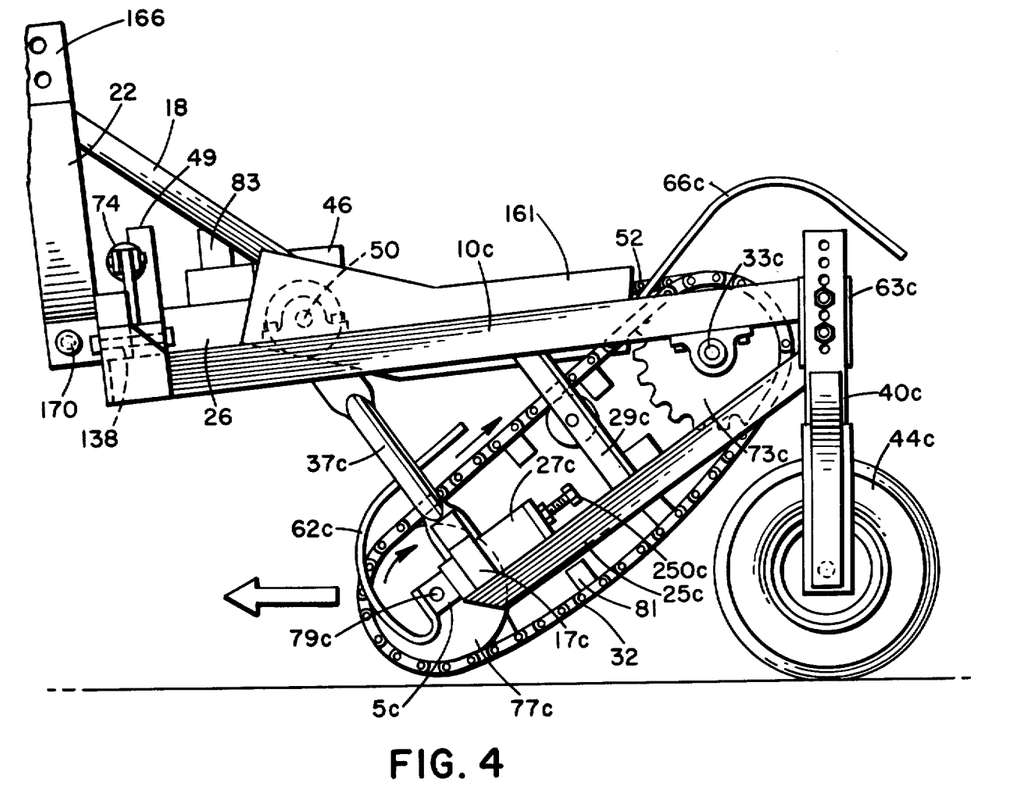
FIG. 4 illustrates in an end elevation the peanut fluffer illustrated in FIG. 1.

As best illustrated in FIGS. 1 thru 3, gear box 46 has its input shaft 48 projecting towards a tractor position. Shaft 48 is coupled to the power train output (P.T.O.) of a tractor by a linking shaft (not shown). Output shaft 50 extending from gear box 46 is coupled to drive chain 52 via a sprocket 68 to supply motive power to the three fluffer sections A, B, C in a manner more fully described below.

Continuing with the description of the middle conveyor section B, a pair of endless chains 30 and 32 are provided on the interior sides of frame members 8 and 10. Endless chains 30 and 32 are constrained to revolve about sprockets 71 and 73 (identified but not clearly shown in FIG. 1) which are in turn connected with shaft 33, and about idler wheels 75 and 77. In contrast to sprockets 71 and 73, idler wheels 75 and 77 have a smooth circumferential surface. Idler wheels 75 and 77 are interconnected by a non-rotatable shaft 79 while the sprockets 71 and 73 are interconnected by rotatable shaft 33. Shafts 33 and 79 are covered by protective sleeves (not shown).

Figure 7:
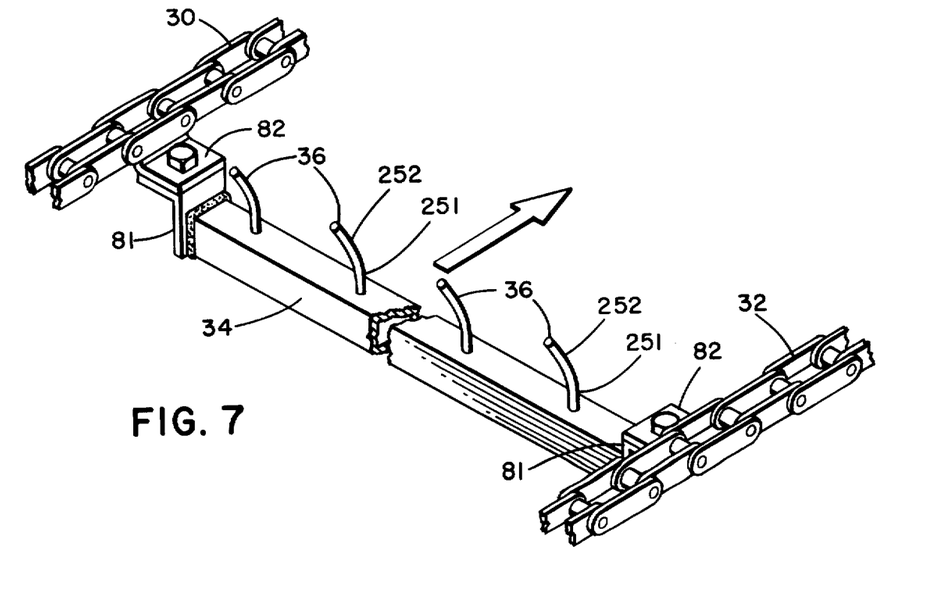
FIG. 7 illustrates in a fragmentary isometric view the upper flight of a vine pick-up bar and associated conveyor drive chain assembly.

Extending between and coupled to chains 30 and 32 are a plurality of spaced bars 34 containing upstanding pins 36 (FIG. 7). The bars 34 are mounted to the chains 30 and 32 by brackets 81 mounted to the bars 34 which are connected with associated chain link elements 82. The pair of endless chains 30 and 32 and associated bars 34 constitute an endless conveyor provided at an angle relative to the ground. The lowest portion 7 of the endless conveyor forms the input and is provided at the front edge of conveyor section B, while the highest portion 9 of the endless conveyor forming the output is provided at the rear. The highest point 9 of the conveyor section is relatively close to the ground so that the transported vines are gently discharged.

Pins 36 are preferably formed with a first portion 251 projecting straight up from an associated bar 34 and a second portion 252 bent or inclined relative to bar 34. The pins are inclined in a negative direction relative to vine flow on the conveyor; that is, the concave face of each pin faces the pulling tractor when bars 34 are on the top portion of the endless chain of the conveyor, and faces away from the pulling tractor when bars 34 are on the lower portion of the conveyor chains 30 and 32. The amount of pin bending is preferably near or within the range of 25° to 28°. Bending of the pins in this manner prevents wrapping of the vines around the conveyor bars under certain combinations of conveyor operating speed and ground speed of the fluffer device. The use of bent pins allows for more flexibility in the running operation of the conveyor without adversely effecting the lifting of the windrows on the leading or input end of the conveyor. The pins 36 are arranged such that their outer extremities remain below the top level of the conveyor chains 30 and 32 to further facilitate vine release.

The outer conveyor sections A and C are constructed in substantially the same manner as the center conveyor section and need not be described in detail. Each contains a frame assembly which corresponds very closely to that of the center section. Common elements are indicated by the same reference numerals as used in the description of the center section, but subscripted with an "a" for section A and "C" for section C.

The main difference between the two outer sections A and C and the central section B is that the outer sections are not provided with the three point trailer hitch, gear box supporting structures, or the power transmitting structures which are provided in the central section. Sections A and C also contain respective stiffening cross-braces 90a and 90c which are not provided in the middle conveyor section B.

The raising and lowering mechanism for the outer conveyor sections A and C will now be described in detail. Outer section A is connected to central section B through universal joint 150, a hydraulic cylinder 72, and a pivot pin 140. Outer section C is connected to central section B through universal joint 156, hydraulic cylinder 74, and pivot pin 138. As best illustrated in FIG. 2, the front frame member of each outer conveyor section, 14a for section A and 14c for section C, extends beyond respective frame members 10a and 8c to overlap with front frame member 14 of the center conveying section B. Overlapping frame members 14a and 14c are coupled to the center section frame member 14 via the above-mentioned pins 140 and 138 which form pivot points about which the outer sections rotate. Rectangular tubing members 117a and 117c are connected with respective frame members 14a and 14c while frame extensions 142a and 142c are connected respectively with members 14a and 14c. Frame extensions 69 and 70 are connected with frame member 14 of the middle conveyor section B. The hydraulic cylinders 72 and 74 are respectively coupled between frame extensions 142a and 69, and between the frame extensions 70 and 142c via a conventional pin mounting. The pivoting pins 140 and 138 are aligned with the universal joints 150 and 156 forming a pair of pivot axes about which the outer conveyor sections rotate. The universal joints 150, 156 which couple the middle section drive shaft 33 to respective outer section drive shafts 33a and 33c, serve as both the driving points and rear frame supports for outer sections A and C.

When cylinders 72 and 74 are actuated by appropriate hydraulic fluid signals, they function to raise and lower the outer conveyor section about their respective pivot axis. Hydraulic fluid supply to cylinders 72 and 74 originates from a suitable check valve and hose connection assembly 81 and T fittings 78. The location of the hydraulic cylinders 72 and 74 ensures that the stress load created by their operation is concentrated on the front pivot points 138 and 140 rather than on the critical universal joints 150 and 156.

Figure 8:
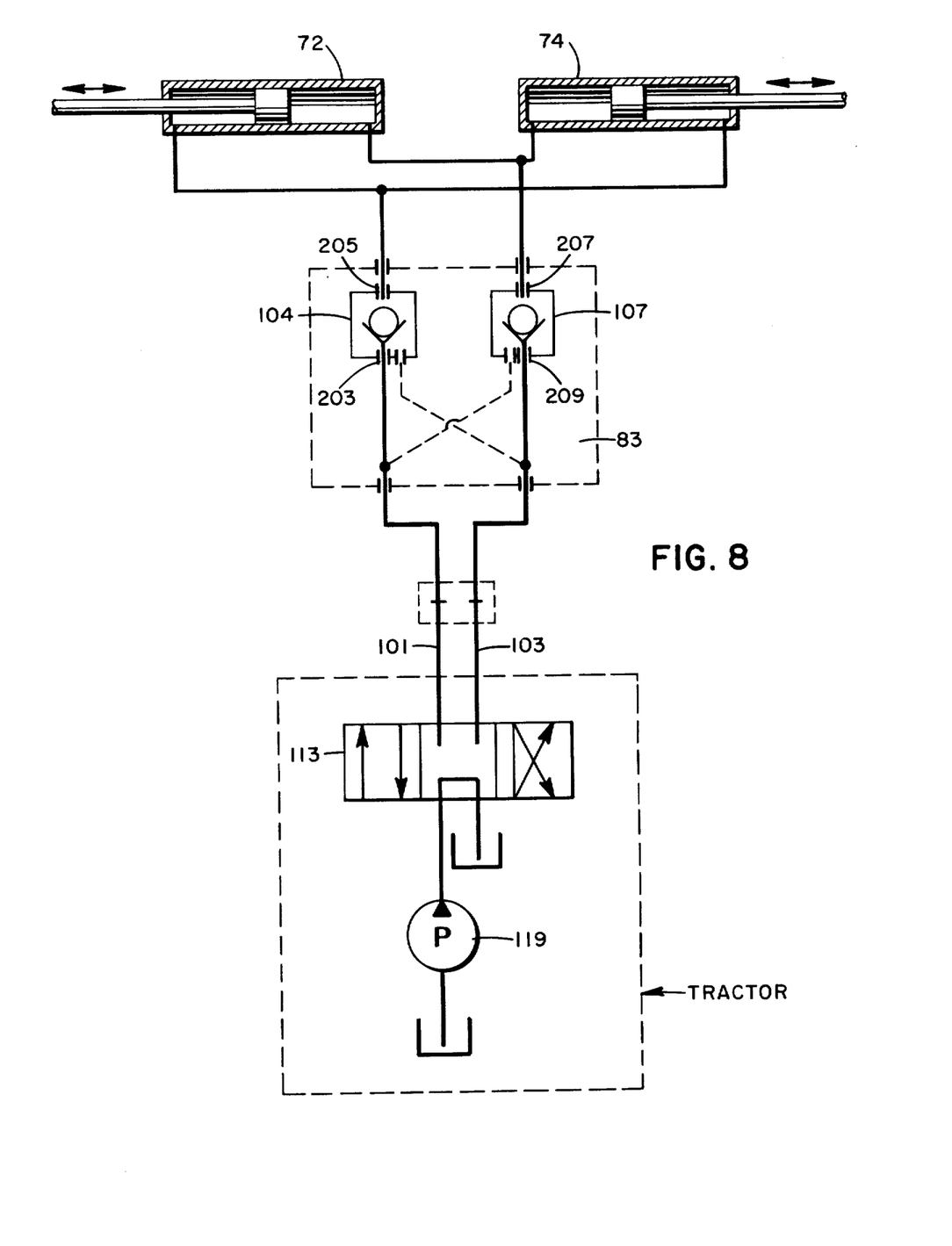
FIG. 8 illustrates in schematic diagram form the hydraulic control system which raises and lowers the outer conveyor sections.

The hydraulic fluid control system including the pilot check valve assembly is schematically illustrated in FIG. 8. A hydraulic pump 119 is usually provided on a tractor and is coupled to a control valve 113. Two lines 101 and 103 couple the hydraulic fluid output from tractor control valve 113 to the input of the pilot operated check valve and hose connection assembly 83. When it is desired to raise the outer conveyor sections, fluid is supplied from the tractor through line 101, first main flow port 203 and second main flow port 205 of pilot check valve 104, to the appropriate "raise" input port of the respective hydraulic cylinders 72 and 74. Return fluid flow caused by the displacement of the pistons within the cylinders 72 and 74 flows through second main flow port 207 and first main flow port 209 of check valve 107, and fluid line 103 to a hydraulic fluid reservoir 121 located on the tractor. When a lowering operation is desired, control valve 121 is repositioned to cause fluid flow to pass from the tractor along line 103 through first and second main flow ports 209 and 207 of pilot check valve 107 to the appropriate "lower" input port of the hydraulic cylinders and return hydraulic fluid flows through first and second main flow ports 205 and 203 of pilot operated check valve 105 and line 101 to hydraulic fluid reservoir 121. Dotted fluid flow lines 109 and 111 represent pilot control inputs to respective pilot operated check valves 107 and 105. The pilot line for each valve is cross-coupled to an opposite input hydraulic line and must contain a specified amount of pressure before either check valve 107 or 105 can be operated to permit fluid flow. With this arrangement, the hydraulic cylinders can only be activated upon the supply of hydraulic fluid pressure from the tractor. As a result, any rupture in fluid supply lines 101 or 103 would not result in an undesired lowering of the outer conveyor sections. The pilot operated check valves not only eliminate any danger of raised outer sections falling during storage, but also assure that raised outer conveyor sections will not creep down during transport.

Although FIG. 8 illustrates a typical hydraulic control system which might be contained on a tractor, it should be appreciated that other suitable arrangements can also be employed as long as lines 101 and 103 are supplied with hydraulic fluid in the manner recited above.

Figure 6:
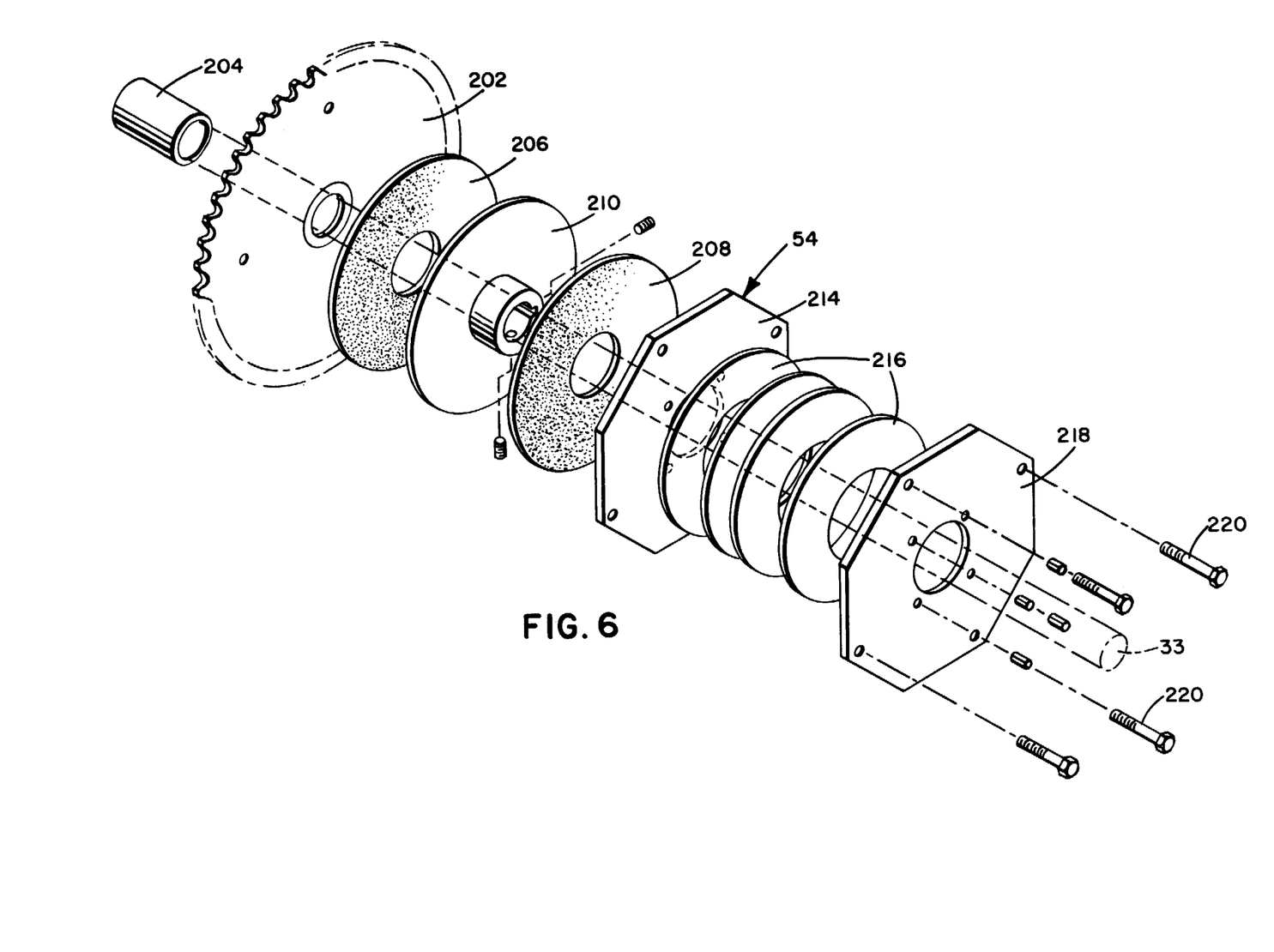
FIG. 6 illustrates in an exploded perspective view the slip clutch illustrated in FIG. 1.

Motive power for all three conveyor sections is provided by a pulling tractor through a shaft (not shown) coupled to drive shaft 48 of gear box 46 located on the center conveyor section B. The output shaft 50 of this gear box is coupled to an endless drive chain 52 via a drive sprocket 68. Drive chain 52 is further coupled to an adjustable idler wheel 47, provided for varying the tension on drive chain 52, and to a chain sprocket 202 (FIG. 6) which forms part of a slip clutch assembly 54. As illustrated in FIG. 6, sprocket 202 rotates about a shaft sleeve 204 encircling drive shaft 33 of center conveyor section B and is coupled via friction discs 206 and 208 to a drive disc 210. Drive disc 210 is provided with a keyway which mates with driving shaft 33. Shaft 33 in turn is connected at opposite ends with the universal joints 150 and 156 which in turn are connected with driving shafts 33a and 33c for the outer conveyor sections. The driving shafts 33a, 33, 33c for the three conveyor sections, when driven, rotate respective sprocket pairs 71a, 73a; 71, 73; and 71c, 73c to drive respective endless chain pairs 30a, 32a; 30, 32; 30c, 32c and associated bars 34 and pins 36 for the conveyor sections.

The clutch assembly 54 also includes a spring and clutch disc 214, a series of springs 216 and a spring mounting disc 218. Spring mounting disc 218, springs 216, spring clutch disc 214, and sprocket 202 are held together via screws or bolts 220. Under normal operating conditions with the outer conveyor sections in the lowered position, motive power supplied to sprocket 202 from chain 52 is coupled via slip clutch 54 to drive shafts 33a, 33b, 33c in an unimpeded manner. However, if a tractor operator inadvertently engages the power train output (P.T.O.) of the tractor when the outer conveyor sections A and C are in a raised position (which prevents the rotation of universal shafts 150 and 156), clutch 52 will slip and prevent damage to the mechanical elements of the fluffer or tractor P.T.O. The slip clutch assembly also allows the outer sections to be raised or lowered on tractors equipped with a P.T.O. brake even if the brake is engaged.

The drive chain 52 and associated idler (47) and sprocket wheel 202 are partially protected from dirt, mud, vines, etc., by a suitable covering or housing 161.

Appropriate gear ratios are chosen to provide a conveyor speed for sections A, B, C which allows the windrow vines to be lifted, transported as a continuous belt across the conveyors, and deposited at the conveyor outputs without pitching of any vines or unnecessary break up of the windrows. This helps to ensure that the peanuts will not prematurely detach from the vines.

As best illustrated in FIG. 3, frame support members 14a and 14c of the outer conveyor sections A and C are provided with extensions 136a and 136c which extend beyond the pivot points 140 and 138. These extensions provide parking stands for the foldable fluffer when the outer sections are raised, thus facilitating storage and transport of the fluffer mechanism while dispensing with the need for additional jacks, stands, or other support devices.

When the fluffer is in a full folded position, the outer sections A, C are at an angle greater than 90° with respect to their lowered or horizontal position thereby providing the folded fluffer with a high degree of stabilization. However, although a fully loaded position is illustrated in FIG. 3, it should be appreciated that the outer conveyor sections of the fluffer can be held in any position between the operative horizontal position and the fully raised and inclined positions illustrated in FIG. 3.

In order to allow the foldable fluffer to better deal with windrows having uneven edges in which vines project irregularly, suitable input vine guides are provided on all three conveyor sections. These vine guides, illustrated at numerals 60a and 62a for section A, 60 and 62 for section B, and 60c and 62c for section C, are respectively provided in front of each of the conveyor section chains 30a, 32a; 30, 32; 30c, 32c. They are constructed as round curved rods which intersect a plant established by an adjacent endless chain. These rods, which initially bend outward and then back toward the conveyor sections, function to channel errant vines at the edge of a windrow toward the center of each conveyor section. Each vine guide is attached to a respective idler wheel adjusting block provided for each endless chain of the conveyor units and moves in unison with movement of the idler wheels. With this arrangement, the distance between a vine guard and associated conveyor chain remains the same as the chain tension is adjusted.

Discharge vine guides 64a, 66a; 64, 66; 64c, 66c are also optionally provided on the discharge ends of the conveyors A, B and C, respectively, to again help channel the fluffed vines into a uniform windrow.

In operation, a tractor is coupled to the three point hitch of the fluffer at points illustrated by reference numerals 166, 168 and 170. The P.T.O. of the tractor is attached via a shaft (not shown) to gearbox input shaft 48, and the hydraulic fluid control lines (101, 103) on the tractor are connected with check valve assembly 81. Since the fluffer was probably folded for storage prior to use, the tractor operator maneuvers the folded fluffer to a position where the outer sections A, C can conveniently be lowered. Lowering is accomplished by supplying hydraulic pressure to the appropriate output line 103 via tractor mounted control valve 113. After lowering of the outer sections, the operator aligns the three fluffer sections over three adjacent windrows and begins the fluffing operation by engaging the P.T.O. output to cause the conveyor chains to begin rotating. As the fluffer is transported along the windrows by the tractor, the leading edge of each conveyor section, i.e., that closest to the ground, picks up the vines via the negatively bent pins and transports them in a generally continuous belt along the upper surface of the conveyor sections to the conveyor output where the continuous vine belt is gently discharged without pitching or inverting the plants. When the fluffing operation is completed, the tractor operator may again raise the outer conveyor sections A and C by supplying hydraulic pressure to line 101 for transporting the fluffer to a new location or for storage. Should the operatoraccidentally engage the tractor P.T.O. when the outer sections A and C are raised, slip clutch 54 prevents any damage which otherwise would be caused by the universal joints 150, 156 being in a locked position. When storage is desired, the tractor is uncoupled from the fluffer and the fluffer is supported by the tires 42 and 44 of the center conveyor section B and the parking stands 136a and 136c.

Although the present invention has been described with reference to a particular embodiment thereof, it should be appreciated that various modifications can be made to this specific embodiment without departing from the spirit and scope of the present invention. For example, although the invention has been particularly described with reference to fluffing peanut plants, other types of plants may also be fluffed with the invention. Also, more than one continuously horizontal center conveyor section may be used along with the foldable outer sections. Accordingly, the foregoing description is to be taken as purely exemplary and not limiting of the present invention which is defined solely by the appended claims.

What is claimed is:

1. A foldable vine fluffing apparatus comprising:
    a first and second outer vine conveyor sections and at least one middle vine conveyor section, each section comprising:
        a frame assembly;
        a pair of endless parallel transporting chains mounted in said frame assembly;
        a plurality of parallel rods having opposite ends connected with said chains, said rods being spaced along said chains and each having a plurality of pins extending in a direction outward of said rods; said rods, associated pins and chains forming a vine conveying mechanism having an input located adjacent the ground level and an output spaced above the ground level; and,
        a driving shaft coupled to, a pair of sprockets engaged respectively with said chains, said driving shaft being adapted to rotate said endless transporting chains and connected rods;
    means for pivotably coupling the frame assembly of said first and second outer conveyor sections with the frame assembly of said at least one middle section about respective first and second pivot points;
    a pair of universal joints respectively coupling the driving shafts of said first and second outer conveyor sections with the driving shaft of said at least one middle conveyor section, said universal joints forming along with said first and second pivot points a pair of pivot axes about which said first and second outer conveyor sections may rotate relative to said at least one middle section;
    a power transmission means having an input shaft, said power transmission means being coupled to the driving shaft of said at least one middle conveyor section for transmitting rotative power applied to said input shaft to said driving shaft of said at least one middle conveyor section;
    a pair of hydraulic cylinders coupled respectively between the frames of said first and at least one middle and said at least one middle and said second conveyor sections for rotating and raising said first and second outer conveyor sections about said pair of pivot axes;
    a hydraulic fluid device for coupling an applied hydraulic fluid to said hydraulic cylinders; and
    a slip clutch provided between said power transmission means and the driving shaft of said second conveyor section, said slip clutch preventing the transmission of motive power to the driving shafts of said first, second and middle conveyor sections when said first and second conveyor sections are between a partially and fully raised position.

2. A folding peanut vine fluffing apparatus comprising:
    a first, second and third peanut vine conveyor sections, each section comprising:
        a frame assembly;
        a pair of endless parallel transporting chains mounted in said frame assembly;
        a plurality of parallel rods having opposite ends connected with said chains, said rods being spaced along said chains and each having a plurality of pins extending in a direction outward of said rods; said rods, associated pins and chains forming a peanut vine conveying mechanism having an input located adjacent the ground level and an output located above the ground level;
        a driving shaft coupled to a pair of sprockets engaged respectively with said chains, said driving shaft being adapted to rotate said endless transporting chains and connected rods;
    first and second frame extensions provided respectively on the frame assembly of said first and third conveyor sections said first and second frame extensions extending across and being pivotably coupled at a pivot point with the frame assembly of said second conveyor section, said first and second frame extensions extending beyond said pivot points to form parking stands capable of supporting said folding fluffer when said first and third conveyor sections are rotated about said pivot points;
    a pair of universal joints respectively coupling the driving shafts of said first and third conveyor sections to the driving shaft of said second conveyor, said universal joints forming along with said pivot points a pair of pivot axes about which said first and third conveyor sections may rotate relative to said second section, said pivot points and universal joints constituting the only interconnection of said first and third conveyor sections with said second conveyor section;
    a power transmission means having an input shaft, said power transmission means being coupled to the driving shaft of said second conveyor section for transmitting rotative power applied to said input shaft to said driving shaft of said second conveyor;
    a slip clutch provided between said power transmission means and the driving shaft of said second conveyor section, said slip clutch preventing the transmission of motive power to the driving shafts of said first, second and third conveyor sections when said first and third conveyor sections are between a partially and fully raised position;
    a pair of hydraulic cylinders coupled respectively between the frames of said first and second and second and third conveyor sections for rotating and raising said first and third conveyor sections about said pair of pivot axes;
    a hydraulic fluid control input device for coupling an applied hydraulic fluid to said hydraulic cylinders, said hydraulic fluid control input device including first and second hydraulic inputs coupled respectively to a first main flow port of first and second pilot operated check valves, the pilot control port of said first check valve being coupled for operation by hydraulic fluid pressure in said second input and the pilot control port of said second check valve being coupled for operation by hydraulic fluid pressure in said first input, the second main flow port of said first pilot operated check valve being coupled to a hydraulic control "raise" input port on each of said cylinders, and the second main flow port of said second pilot operated check valve being coupled to a hydraulic fluid control "lower" input port on each of said cylinders, said pilot operated check valves functioning to maintain said first and third conveyor sections at a predetermined raised position should the flow of hydraulic fluid into said hydraulic fluid control input be interrupted; and, a pair of bar vine guards provided on each conveyor section, each vine guard of said pair being arranged in front of an associated endless conveyor chain at the input of the conveyor mechanism and at an angle oblique with respect to the plane in which the associated endless chain rotates, said pair of vine guards being adapted to channel vines at the edges of the conveyor sections into the center of the conveyor sections.

3. A folding vine fluffing apparatus as in claim 2 wherein said pins are bent at an angle between substantially 25° and 28° in a negative direction relative to the direction of vine transport by said conveyor sections.

* * * * *